(12) United States Patent
Hammerschmidt (10) Patent No.: US 11,027,744 B2
(45) Date of Patent: Jun. 8, 2021

(54) APPARATUS AND METHOD FOR CONTROLLING A SENSOR DEVICE OF AN OBJECT'S SAFETY SYSTEM, CONTROL SYSTEM FOR AN AUTOMOTIVE VEHICLE, AND SENSOR DEVICE FOR A SAFETY SYSTEM OF AN AUTOMOTIVE VEHICLE

(71) Applicant: Infineon Technologies AG, Neubiberg (DE)

(72) Inventor: Dirk Hammerschmidt, Finkerstein (AT)

(73) Assignee: Infineon Technologies AG, Neubiberg (DE)

( * ) Notice: Subject to any disclaimer, the term of this patent is extended or adjusted under 35 U.S.C. 154(b) by 212 days.

(21) Appl. No.: 15/901,209

(22) Filed: Feb. 21, 2018

(65) Prior Publication Data

US 2018/0237028 A1 Aug. 23, 2018

(30) Foreign Application Priority Data

Feb. 23, 2017 (DE) .............................. 102017103724

(51) Int. Cl.
*B60W 50/02* (2012.01)
*B60R 21/013* (2006.01)
*B60R 21/01* (2006.01)
*G07C 5/00* (2006.01)
(Continued)

(52) U.S. Cl.
CPC ......... *B60W 50/0205* (2013.01); *B60R 21/01* (2013.01); *B60R 21/013* (2013.01); *G07C 5/008* (2013.01); *B60R 16/023* (2013.01); *B60R 2021/0119* (2013.01);
(Continued)

(58) Field of Classification Search
CPC ................................................ B60W 50/0205
See application file for complete search history.

(56) References Cited

U.S. PATENT DOCUMENTS 5,605,202 A * 2/1997 Dixon ..................... B60R 21/01
180/268
5,939,625 A * 8/1999 Torii ....................... B60T 8/885
267/140.11
(Continued)

FOREIGN PATENT DOCUMENTS

CN 105711841 A 6/2016
DE 19811865 A1 9/1999
(Continued)

OTHER PUBLICATIONS

German Patent Office, Office Action issued for DE 102017103724.1, 8 pgs., dated Dec. 13, 2017.
(Continued)

*Primary Examiner* — Alex C Dunn
(74) *Attorney, Agent, or Firm* — Schiff Hardin LLP (57) ABSTRACT

An apparatus for controlling a sensor of an object's safety system is provided. The apparatus includes an input node configured to receive safety information about a likelihood that the sensor senses a safety-relevant event. Further, the apparatus includes a processing circuit configured to control the sensor to perform a sensor diagnosis procedure, if the safety information indicates that it is unlikely that the sensor senses the safety-relevant event within a future period of time.

15 Claims, 5 Drawing Sheets

(51) Int. Cl.
*B60R 16/023* (2006.01)
*H04L 12/40* (2006.01)
(52) U.S. Cl.
CPC .............. *B60W 2050/021* (2013.01); *B60W 2050/0215* (2013.01); *H04L 2012/40273* (2013.01)

(56) References Cited

U.S. PATENT DOCUMENTS

| | | | | |
|---|---|---|---|---|
| 6,733,036 B2 * | 5/2004 | Breed | ................ | B60N 2/0232 180/274 |
| 6,827,308 B2 * | 12/2004 | Fujii | ................ | B60R 22/44 180/268 |
| 6,859,705 B2 * | 2/2005 | Rao | ................ | G01S 11/12 701/45 |
| 6,944,543 B2 * | 9/2005 | Prakah-Asante | ...... | G08G 1/166 701/301 |
| 7,039,513 B2 * | 5/2006 | Hermann | ............ | B60R 21/0132 280/735 |
| 7,082,359 B2 * | 7/2006 | Breed | ................ | G07C 5/008 701/31.5 |
| 7,138,938 B1 * | 11/2006 | Prakah-Asante | ..... | G01S 15/931 342/70 |
| 7,233,235 B2 * | 6/2007 | Pavlish | ................ | B60R 21/01 340/438 |
| 7,236,865 B2 * | 6/2007 | Prakah-Asante | ... | B60R 21/0134 180/271 |
| 7,359,775 B2 * | 4/2008 | Strege | ................ | G01B 21/26 700/279 |
| 7,427,914 B2 * | 9/2008 | Plantamura | ........... | B60W 50/14 340/425.5 |
| 7,561,951 B2 * | 7/2009 | Rao | ................ | B60W 50/0205 180/268 |
| 7,568,544 B2 * | 8/2009 | Hirota | ................ | B60N 2/42736 180/274 |
| 7,974,748 B2 * | 7/2011 | Goerick | ............ | G06K 9/00805 701/28 |
| 8,437,890 B2 * | 5/2013 | Anderson | ............ | B60W 50/10 701/3 |
| 8,786,421 B2 * | 7/2014 | Dozza | ................ | B60Q 5/006 340/468 |
| 8,996,255 B2 * | 3/2015 | Munch | ................ | B60R 21/0132 701/45 |
| 9,418,551 B2 * | 8/2016 | Kavaler | ................ | G01S 13/931 |
| 9,938,908 B2 * | 4/2018 | Li | ................ | F02D 41/1406 |
| 10,032,324 B2 * | 7/2018 | Akanuma | ............ | G07C 5/0808 |
| 2002/0161495 A1 * | 10/2002 | Yamaki | ................ | G07C 5/008 701/33.8 |
| 2007/0106474 A1 * | 5/2007 | Ide | ................ | B60R 21/0132 701/301 |
| 2007/0276561 A1 * | 11/2007 | Tripathi | ................ | G08G 1/205 701/29.5 |
| 2007/0290535 A1 * | 12/2007 | Meredith | ............... | B60N 2/507 297/217.1 |
| 2009/0222142 A1 * | 9/2009 | Kao | ................ | G05B 15/02 700/291 |
| 2013/0058373 A1 * | 3/2013 | Sakurada | ............. | F02D 41/222 374/4 |
| 2014/0336976 A1 * | 11/2014 | Nakamura | ............. | G01P 15/18 702/141 |
| 2015/0100208 A1 * | 4/2015 | Wogel | ................ | B60R 21/013 701/45 |
| 2015/0116114 A1 * | 4/2015 | Boyles | ................ | G08G 1/20 340/539.17 |
| 2015/0334668 A1 * | 11/2015 | Weber | ................ | H04W 56/003 455/404.1 |
| 2016/0316293 A1 * | 10/2016 | Klimanis | ............ | G10L 21/0208 |
| 2016/0350671 A1 * | 12/2016 | Morris, II | ........ | G05B 23/0229 |
| 2017/0023945 A1 * | 1/2017 | Cavalcanti | ........... | G08G 1/0141 |
| 2018/0005534 A1 * | 1/2018 | Jesudason | ............. | B64D 47/08 |
| 2018/0182181 A1 * | 6/2018 | Dolan | ................ | G06T 11/206 |

FOREIGN PATENT DOCUMENTS

| | | |
|---|---|---|
| DE | 69633422 T2 | 8/2006 |
| EP | 1783008 A2 | 5/2007 |
| WO | 2010017431 A2 | 2/2010 |

OTHER PUBLICATIONS

Office Action dated Aug. 5, 2020 dated for Chinese Patent Application No. 201810146546.6.

* cited by examiner

APPARATUS AND METHOD FOR CONTROLLING A SENSOR DEVICE OF AN OBJECT'S SAFETY SYSTEM, CONTROL SYSTEM FOR AN AUTOMOTIVE VEHICLE, AND SENSOR DEVICE FOR A SAFETY SYSTEM OF AN AUTOMOTIVE VEHICLE

FIELD

Examples relate to enhanced sensor diagnostics. In particular, examples relate to an apparatus and a method for controlling a sensor device of an object's safety system, a control system for an automotive vehicle, and a sensor device for a safety system of an automotive vehicle

BACKGROUND

Sensors conventionally run a startup test after power up. For example, airbag sensors run a startup test after power up and deliver some measurements and status information back to the restraint system. The startup messages consist of a clearly defined sequence and the Electronic Control Unit (ECU) knows its length (number of messages) and the predefined context of each message.

Once the startup test is passed, sensors only transmit regular measurements. For performing another sensor self-test, a controller of the sensor (e.g. an ECU) has no other option than interrupting the power supply and reinitiate the startup. This is only acceptable in exceptional cases. For example, for an airbag sensor, the power down needs to last longer than the best case micro break protection time. The startup sequence of the sensor is quite long, and the startup sequence cannot be interrupted. During the startup sequence, the airbag system cannot decide to deploy any airbag that is influenced by the sensor since it is offline.

Hence, there may be a demand for enhanced sensor diagnostics.

SUMMARY

Such a demand may be satisfied by examples described herein.

An example relates to an apparatus for controlling a sensor device of an object's safety system. The apparatus comprises an input node configured to receive safety information about a likelihood that the sensor device senses a safety-relevant event. Further, the apparatus comprises a processing circuit configured to control the sensor device to perform a sensor diagnosis procedure, if the safety information indicates that it is unlikely that the sensor device senses the safety-relevant event within a future period of time.

Another example relates to a control system for an automotive vehicle. The control system comprises a safety system of the automotive vehicle. The safety system comprises a sensor device configured to sense a safety-critical quantity. Further, the control system comprises the above apparatus for controlling the sensor device.

A further example relates to a sensor device for a safety system of an automotive vehicle. The sensor device comprises an input node configured to receive a control signal from an electronic control unit of the automotive vehicle, if it is unlikely that the sensor device senses a safety-relevant event within a future period of time. The control signal comprises a command causing the sensor device to perform a sensor diagnosis procedure.

Still another example relates to a method for controlling a sensor device of an object's safety system. The method comprises receiving safety information about a likelihood that the sensor device senses a safety-relevant event. Further, the method comprises controlling the sensor device to perform a sensor diagnosis procedure, if the safety information indicates that it is unlikely that the sensor device senses the safety-relevant event within a future period of time.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
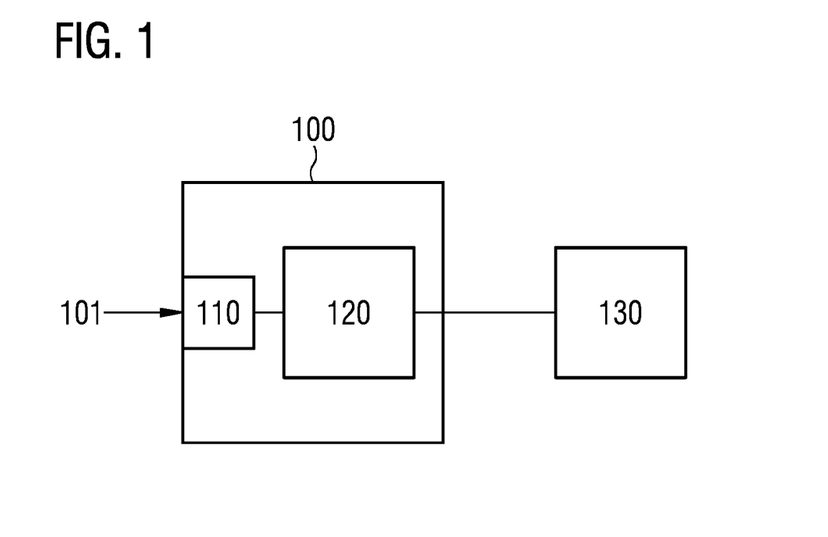
FIG. 1 illustrates an example of an apparatus for controlling a sensor device of an object's safety system.

FIG. 1 illustrates an apparatus 100 for controlling a sensor device 130 of an object's safety system. The apparatus 100 comprises an input node 110 configured to receive safety information 101 about a likelihood that the sensor device 130 senses a safety-relevant event. Further, the apparatus 100 comprises a processing circuit 120 configured to control the sensor device 130 to perform a sensor diagnosis procedure, if the safety information 101 indicates that it is unlikely that the sensor device 130 senses the safety-relevant event within a future period of time.

The apparatus 100 may allow to cause the sensor device 130 to perform a sensor diagnosis procedure during regular operation of the safety system. Since the apparatus 100 only controls the sensor device 130 to perform the sensor diagnosis procedure, if the safety information 101 indicates that it is unlikely that the sensor device 130 senses the safety-relevant event within the future period of time, a safety of the object may be maintained.

The sensor diagnosis procedure is a procedure for self-testing one or more functionalities of the sensor device. The sensor diagnosis procedure may also comprise transmitting diagnosis results to the apparatus 100.

The object may be any moveable or immovable device, apparatus, or assembly that is exposed to potential harm, or that may potentially cause harm. For example, the object may be an (automotive) vehicle, an aircraft, an electronic device, or a building.

The object's safety system is a system of the object for protecting the object, or a user of the object from harm or other non-desirable outcomes. For example, the object's safety system may protect a user within the object against external harm events. Also, the object's safety system may protect elements of the object from external harm events or harm caused by other elements of the object.

The object's safety system may determine (detect) harm events and initiate appropriate countermeasures in order to protect the object, elements of the object, or a user of the object from harm. For detecting potential harm, the object's safety system comprises the sensor device. The sensor device senses one or more safety-critical quantities (e.g. an acceleration, a velocity, a current, a voltage, a pressure, a momentum, or a force). For example, if the sensor device senses a safety-relevant event, the object's safety system may initiate appropriate countermeasures.

The safety information 101 indicates how likely a safety-relevant event is sensed by the sensor device. For example, it is unlikely that the sensor device 130 senses a safety-relevant event, if the likelihood is below a defined threshold value.

The safety information 101 may indicate how likely a safety-relevant event is sensed by the sensor device is within a defined period time. The future period of time denotes a period of time that reaches from now into the future. For example, the safety information 101 may indicate that it is unlikely that the sensor device 130 senses the safety-relevant event within the next 100 microseconds (μs), the next 500 μs, the next 10 milliseconds (ms), the next 50 ms, the next 100 ms, the next 500 ms, the next second (s), the next 2 s, the next 5 s, etc.

In some examples, the future period of time may, e.g., be longer than a response time of the safety system in response to the safety-relevant event. The response time of the safety system in response to the safety-relevant event is the period of time that is required by the safety system to detect the safety-relevant event, and to initiate appropriate countermeasures (e.g. deploy an airbag, tightening of a seat belt, stop movement of an element of the object, or interrupting power supply to an element of the object). Accordingly, the sensor device 130 may execute the sensor diagnosis procedure without reducing the safety of the object.

In some examples, the future period of time may, e.g., be longer than a period of time required for executing the sensor diagnosis procedure. The period of time required for executing the sensor diagnosis procedure is period of time required for performing the whole sensor diagnosis procedure. If the future period of time is longer than the period of time required for executing the sensor diagnosis procedure, it may be likely that no safety-relevant event occurs during the sensor diagnosis procedure. Accordingly, the sensor device 130 may execute the sensor diagnosis procedure without reducing the safety of the object.

In order to control the sensor device 130 to perform the sensor diagnosis procedure, the processing circuit 120 may be configured to generate a control signal causing a temporary interrupt of a power supply to the sensor device 130. The control signal may, e.g., be supplied to an apparatus supplying power to the sensor device 130, or to an apparatus controlling the power supply to the sensor device 130. By temporary interrupting the power supply to the sensor device 130, the sensor device 130 may be forced to perform a startup test after restoration of the power supply (i.e. a self-test at startup). For example, the sensor device 130 may be restarted during regular operation of the object's safety system in order to execute the sensor diagnosis procedure.

Alternatively, the processing circuit 130 may be configured to generate a control signal for the sensor device 130. The control signal comprises a command causing the sensor device 130 to perform the sensor diagnosis procedure. For example, the sensor device 130 may be configured to switch from a regular mode of operation to a sensor diagnosis (self-test) mode of operation upon receipt of the control signal (e.g. the sensor device illustrated in FIG. 6). That is, the sensor device 130 may be able to execute a sensor diagnosis procedure not only at startup, but also during regular operation. A period of time for performing the sensor diagnosis procedure may, hence, be reduced compared to startup test after power up.

The sensor device 130 may support different sensor diagnosis procedures. The different sensor diagnosis procedures may require different periods of time for execution. In some examples, the processing circuit 120 may, hence, select one of a plurality of sensor diagnosis procedures as the sensor diagnosis procedure to be executed by the sensor device 130. For example, the selection may be based on the future period of time. The selection of the sensor diagnosis procedure may, e.g., be based on the length of the future period of time. In some examples, the selection may be based on sensor data output by the sensor device 130. For example, if unexpected or noisy sensor data is output by the sensor device 130, a different sensor diagnosis procedure may be selected by the processing circuit 120 than for, e.g., sensor data with low noise level.

In some examples, the processing circuit 120 may be further configured to control the sensor device 130 to immediately return to regular operation, if the safety information no longer indicates that it is unlikely that the sensor device 130 senses the safety-relevant event within the future period of time. This may allow to further increase the safety of the object, since the sensor device 130 may immediately return to regular operation and sense the one or more safety-critical quantities. Accordingly, an availability (operational readiness) of the object's safety system may be restored immediately.

Figure 2:
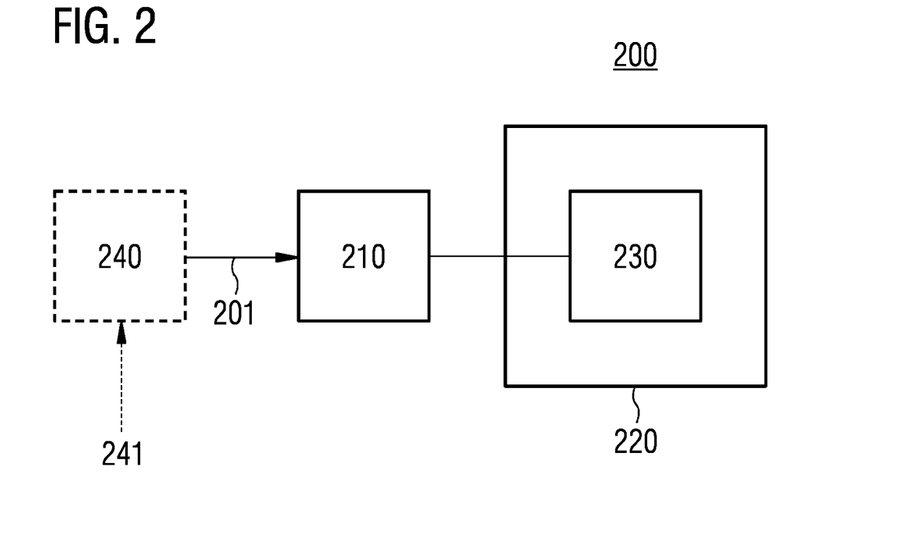
FIG. 2 illustrates an example of a control system for an automotive vehicle.

An example of an implementation using an apparatus for controlling a sensor device of an object's safety system according to one or more aspects of the proposed concept or one or more examples described above is illustrated in FIG. 2. FIG. 2 illustrates a control system 200 for an automotive vehicle. The control system 200 comprises a safety system 220 of the automotive vehicle. The safety system 220 comprises a sensor device 230 configured to sense a safety-critical quantity. Further, the control system 200 comprises an apparatus 210 for controlling the sensor device 230 of the automotive vehicle's safety system 220 according to one or more aspects of the proposed concept or one or more examples described above.

The apparatus 210 may allow to cause the sensor device 230 to perform a sensor diagnosis procedure during regular operation of the safety system 200. Since the apparatus 210 only controls the sensor device 230 to perform the sensor diagnosis procedure, if the safety information 201 indicates that it is unlikely that the sensor device 230 senses a safety-relevant event within a future period of time, a safety of the automotive vehicle may be maintained.

The safety system 220 of the automotive vehicle is a system for protecting the automotive vehicle, or a user of the automotive vehicle from harm or other non-desirable outcomes. For example, the automotive vehicle's safety system 220 may protect a user within the automotive vehicle against external harm events. Also, the automotive vehicle's safety system 220 may protect elements of the automotive vehicle from external harm events or harm caused by other elements of the automotive vehicle. For example, the safety system 220 may be an airbag system, a restraint system, an anti-lock braking system, an electronic stability control system, or a collision avoidance system of the automotive vehicle.

The sensor device 230 senses a quantity that is safety-critical for the safety system 220 (e.g. an acceleration, a velocity, a pressure, a momentum, or a force). This may allow the safety system 220 to identify a safety-relevant event (e.g. a crash, skid of the automotive vehicle, locking of one or more wheels) and initiate appropriate countermeasures.

In some examples, the control 200 may additionally comprise an apparatus 240 for generating the safety information 201. The apparatus 240 for generating the safety information 201 may be configured to receive information 241 related to a driving situation of the automotive vehicle. Further, the apparatus 240 for generating the safety information 201 may be configured to generate the safety information 201 based on the information 241 related to the driving situation of the automotive vehicle.

For example, the apparatus 240 for generating the safety information 201 may evaluate the information 241 related to the driving situation of the automotive vehicle according to one or more predefined criteria. The information related to the driving situation may, e.g., be information related to a quantity sensed by the automotive vehicle, or information related to a quantity sensed by another vehicle or an infrastructure in the vicinity of the automotive vehicle.

For example, the apparatus 240 for generating the safety information 201 may be configured to receive the information 241 related to the driving situation of the automotive vehicle from a driver assistance system of the automotive vehicle and/or a communication system of the automotive vehicle for communication with objects outside the automotive vehicle (e.g. another vehicle, or an infrastructure like a traffic light). A driver assistance system is an electronic system to help the driver in the driving process. For example, a driver assistance system may be a collision avoidance system, an anti-lock braking system, an electronic stability control system, an adaptive cruise control system, a system for highly automated driving, or a system for automated driving.

Driver assistance systems of the automotive vehicle sense the automotive vehicle and its vicinity. Accordingly, this information is already available within the automotive vehicle and may be used (evaluated) for generating the safety information 201.

For example, the apparatus 240 may determine that it is unlikely that the sensor device 230 senses a safety-relevant event within a future period of time if the information 241 related to the driving situation of the automotive vehicle (that are received from one or more driver assistance system of the automotive vehicle and/or or a communication system of the automotive vehicle for communication with external entities) indicate that no other moving objects are inside a defined zone monitored by, e.g., a driver assistance camera and/or a radar system. Also, the information 241 related to the driving situation of the automotive vehicle may, e.g., indicate that the automotive vehicle is completely surrounded by slow moving objects for a defined time (e.g. at a traffic light or in a traffic jam). The information 241 related to the driving situation of the automotive vehicle may further, e.g., indicate that the automotive vehicle is standing still or moving slowly.

In some examples, the information 241 related to the driving situation of the automotive vehicle may indicate a second likelihood that the sensor device 230 senses the safety-relevant event within the future period of time. The second likelihood is determined by the driver assistance system supplying the information 241 to the apparatus 240 based on at least one quantity sensed by the driver assistance system. That is, the driver assistance system may, based on its available information, determine the likelihood that the sensor device 230 senses a safety-relevant event within the future period of time. The apparatus 240 may, hence, already receive information on the likelihood that the sensor device 230 senses a safety-relevant event within the future period of time, and further process this information. This may reduce traffic on a data connection (e.g. a bus) between the apparatus 240 and the one or more driver assistance systems.

For example, the apparatus 240 for generating the safety information 201 may be configured to generate the safety information 201 based on a correlation of the second likelihood and a third likelihood that the sensor device senses the safety-relevant event within the future period of time. The third likelihood is determined by a further driver assistance system based on at least one quantity sensed by the further driver assistance system. That is, the apparatus 240 may receive pieces of information on the likelihood that the sensor device 230 senses a safety-relevant event within the future period of time from various driver assistance systems and correlate these pieces of information in order to determine safety information 201, i.e., the (first) likelihood that the sensor device 230 senses a safety-relevant event within the future period of time.

Alternatively or additionally, the processing circuit of the apparatus 210 for controlling the sensor device may be configured to correlate the safety information 201 with information about at least one quantity sensed by the safety system 220. The processing circuit of the apparatus 210 may be further configured to only control the sensor device 230 to perform the sensor diagnosis procedure, if the safety information 201 coincides with the information about the at least one quantity sensed by the safety system 220. That is, the apparatus 210 may, in some examples, cross-check the safety information 201 with available information of the safety system 220.

In some examples, an ECU of the safety system 220 may comprise the apparatus 210 for controlling the sensor device 230. Another ECU of the control system 200 may comprise the apparatus 240 for generating the safety information 201. This may allow a centralized generation of the safety information.

Alternatively, an ECU of the safety system 220 may comprise the apparatus 210 for controlling the sensor device 230 and the apparatus 240 for generating the safety information 201.

In the following various implementation for a control system of an automotive vehicle are described in connection with FIGS. 3 to 5. In the control systems illustrated in FIGS. 3 to 5, the safety system of the automotive vehicle is an airbag and restraint system.

Figure 3:
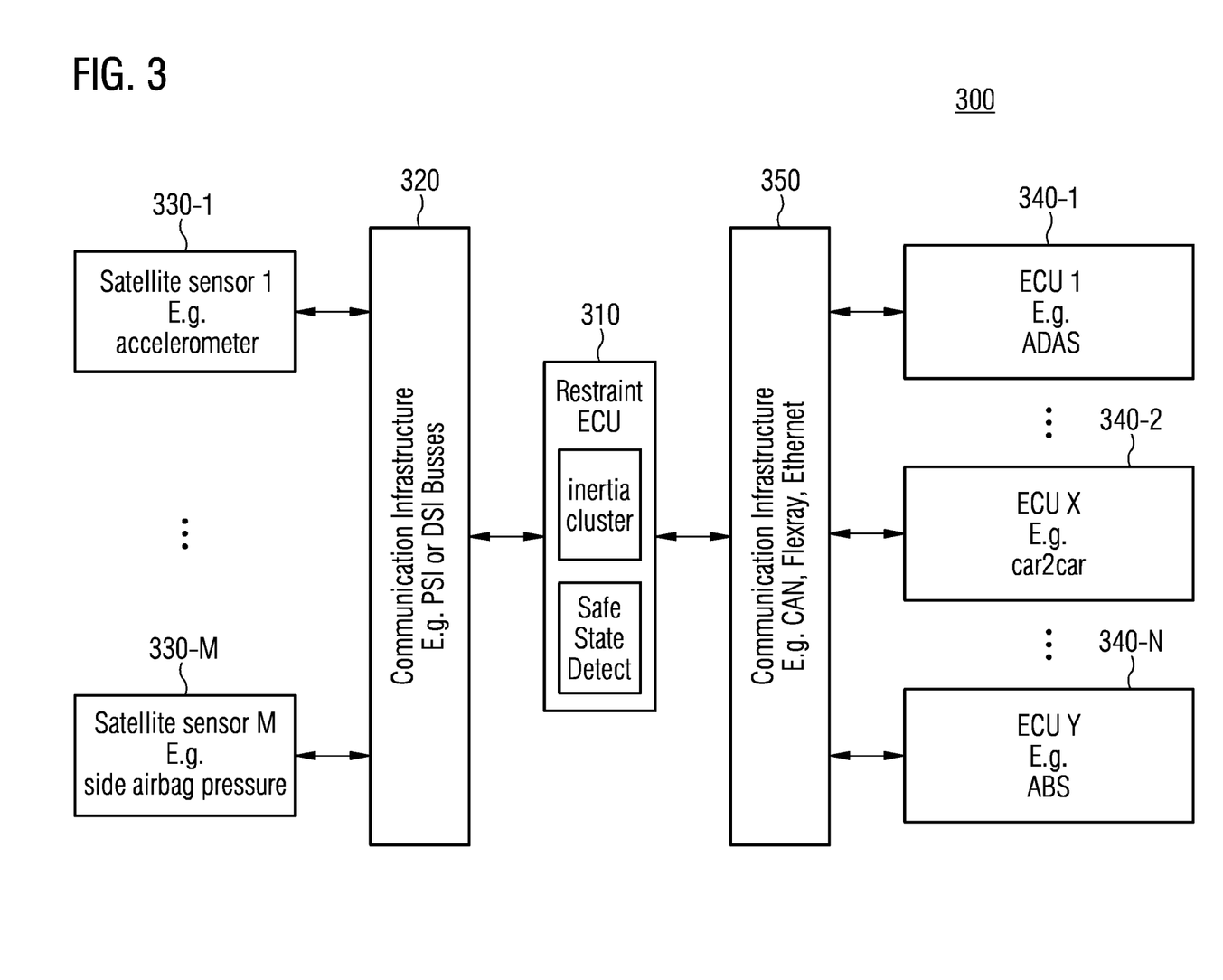
FIG. 3 illustrates another example of a control system for an automotive vehicle.

FIG. 3 illustrates a first exemplary implementation of a control system 300 for an automotive vehicle.

In the control system 300, the functionalities of the above apparatuses for controlling a sensor device, and the functionalities of the above apparatuses for generating safety information are implemented in an ECU 310 of the airbag and restraint system.

The ECU 310 may communicate with a plurality of sensor devices 330-1, . . . , 330-M of the airbag and restraint system. For example the sensor devices 330-1 may be an accelerometer measuring an acceleration of the automotive vehicle, and the sensor devices 330-M may be a pressure sensor measuring a pressure in a side airbag of the automotive vehicle. The ECU 310 further controls the plurality of sensor devices 330-1, . . . , 330-M according to the proposed concept or one or more examples described above. Therefore, the ECU 310 and the plurality of sensor devices 330-1, . . . , 330-M are coupled via a communication infrastructure 320. The communication infrastructure 320 may, e.g., be a Peripheral Sensor Interface (PSI) bus or a Distributed Systems Interface (DSI) bus.

The ECU 310 is further connected to various other ECUs 340-1, 340-2, . . . , 340-N of the automotive vehicle. The various other ECUs 340-1, 340-2, . . . , 340-N may, e.g., control driver assistance systems of the automotive vehicle, or a communication system of the automotive vehicle for communication with objects outside the automotive vehicle (e.g. car-to-car, or car-to-infrastructure). For example, the ECU 340-1 may control an advanced driver assistance system, the ECU 340-2 may control a communication system for car-to-car communication with other vehicles, and the ECU 340-N may control an anti-lock braking system of the automotive vehicle.

The ECU 310 and the various other ECUs 340-1, 340-2, . . . , 340-N are coupled via a further communication infrastructure 350. The further communication infrastructure 350 may, e.g., be a Controller Area Network (CAN) bus, a FlexRay bus, or Ethernet.

The ECU 310 receives information related to the driving situation from the various other ECUs 340-1, 340-2, . . . , 340-N, and determines the likelihood that one or more of the plurality of sensor devices 330-1, . . . , 330-M sense a safety-relevant event within a future period of time. If it is unlikely that one of the plurality of sensor devices 330-1, . . . , 330-M senses a safety-relevant event within a future period of time, the ECU 310 may control the sensor device to perform a sensor diagnosis procedure. For example, if the ECU 310 determines that it is unlikely that the sensor 330-1 senses a safety-relevant event within a future period of time, the ECU 310 may control the sensor device 330-1 to perform a sensor diagnosis procedure.

If the sensor device 330-1 supports more than one sensor diagnosis procedure, the ECU 310 may further select which of the sensor diagnosis procedure is to be executed by the sensor device 330-1, and inform the sensor device 330-1 accordingly. For example, the sensor diagnosis procedure may be selected based on the length of the future period of time and/or sensor data received from the sensor device 330-1 (e.g. based on a noise level of the sensor data).

Hence, the control system 300 may allow to test the plurality of sensor devices 330-1, . . . , 330-M during safe driving situations of the automotive vehicle.

Moreover, if the ECU 310 determines that it is unlikely that the sensor device 330-1 senses a safety-relevant event within the future period of time, it may control the sensor device 330-1 to immediately return to regular operation. Hence, the control system 300 may allow to run extended sensor diagnosis without reducing the restraint system availability.

Airbag systems that are implemented traditionally, have no choice except the assumption that the airbag has to be ready for deployment anytime the power is up. This is because no information concerning the traffic situation is available. On the path towards autonomous driving, more and more environmental sensing is introduced by advanced driving assistance systems that allow to discriminate if accidents are probable within a time frame that is required for a self-test (e.g. 10 ms up to 1s depending on the complexity). As described above, an airbag system may communicate with the driver assistance systems and identify safe driving states. For example, for a safe driving state, no other moving objects may be inside a defined zone monitored by a driver assistance camera and radar systems, or the car may be completely surrounded by slow moving objects for a defined time (e.g. at a traffic light or in a traffic jam). The restraint system may then initiate existing self-tests or more advanced procedures to be executed by the sensors and receive the test results. The sensor may immediately return into a normal operation mode on demand of the ECU without completion of a longer defined test sequence.

Figure 4:
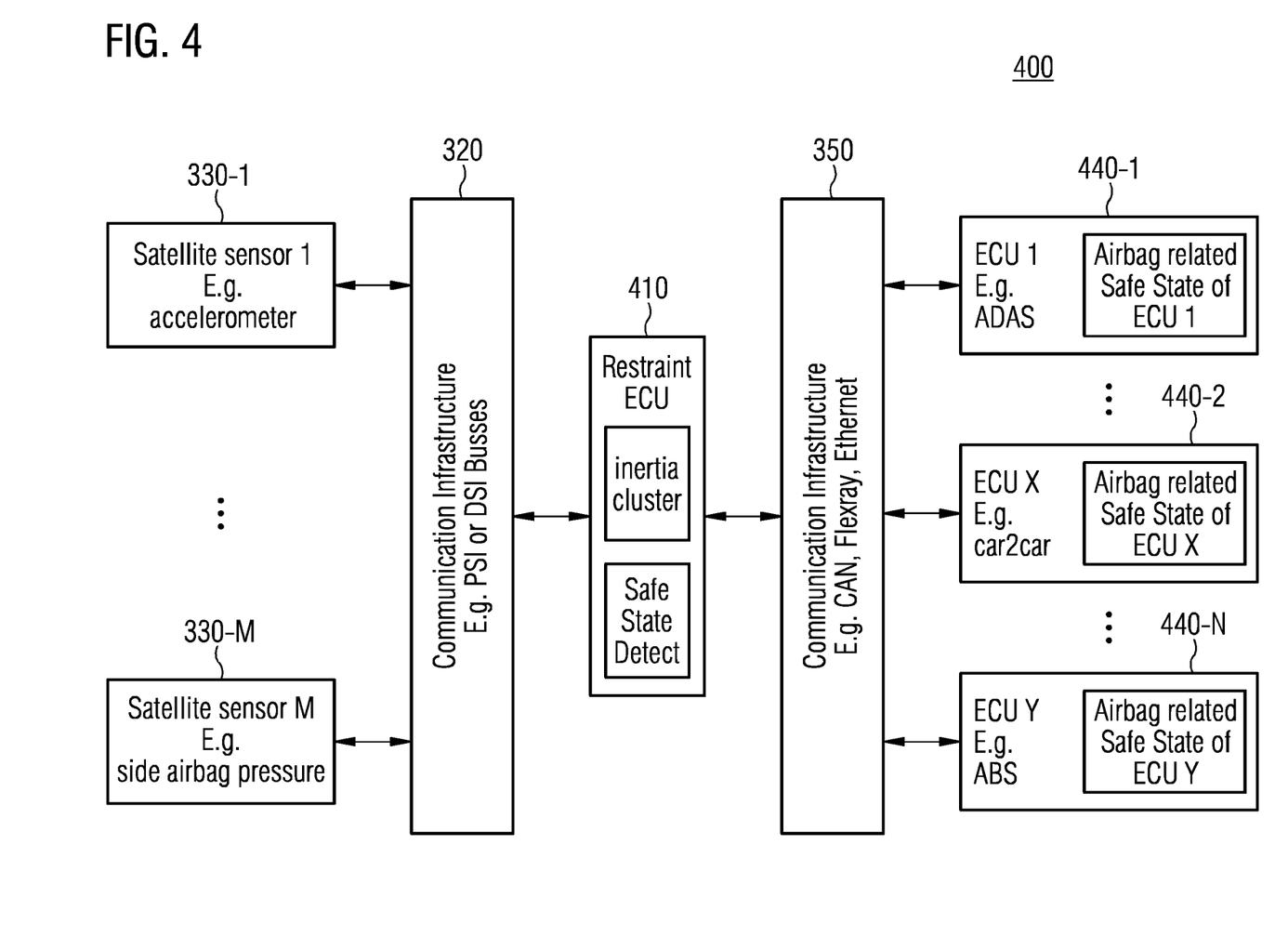
FIG. 4 illustrates a further example of a control system for an automotive vehicle.

FIG. 4 illustrates an alternative control system 400. The control system 400 is similar to the control system 300 illustrated in FIG. 3. However, in the control system 400 the ECU 410 of the airbag and restraint system receives from the various other ECUs 440-1, 440-2, . . . , 440-N likelihoods that one or more of the plurality of sensor devices 330-1, . . . , 330-N sense a safety-relevant event within a future period of time.

The ECU 410 correlates the likelihoods received from the various other ECUs 440-1, 440-2, . . . , 440-N in order to determine the likelihood that one or more of the plurality of sensor devices 330-1, . . . , 330-N sense a safety-relevant event within a future period of time. That is, the ECU 410 generates the safety information based on the correlation of the likelihoods received from the various other ECUs 440-1, 440-2, . . . , 440-N.

Further, the ECU 410 may correlate the safety information with information about at least one quantity sensed by the airbag and restraint system (e.g. an inertia cluster). The ECU 410 may control one or more of the plurality of sensor devices 330-1, . . . , 330-N to perform the sensor diagnosis procedure, only if the safety information coincides with the information about the at least one quantity sensed by the safety system.

In other words, alternatively the detection of safe states may be already partially existent in some of the ECUs, and may be pre-processed in local ECUs that just deliver their own airbag related safe states to the airbag ECU. This ECU only needs to combine these pieces of information and, e.g., additionally crosscheck them with its own sources of information (e.g. the inertia cluster). The advantage of this approach may be a limitation of the data traffic on the central buses, which may be limited in their capacity. The local safe states may, e.g., be standardized.

Figure 5:
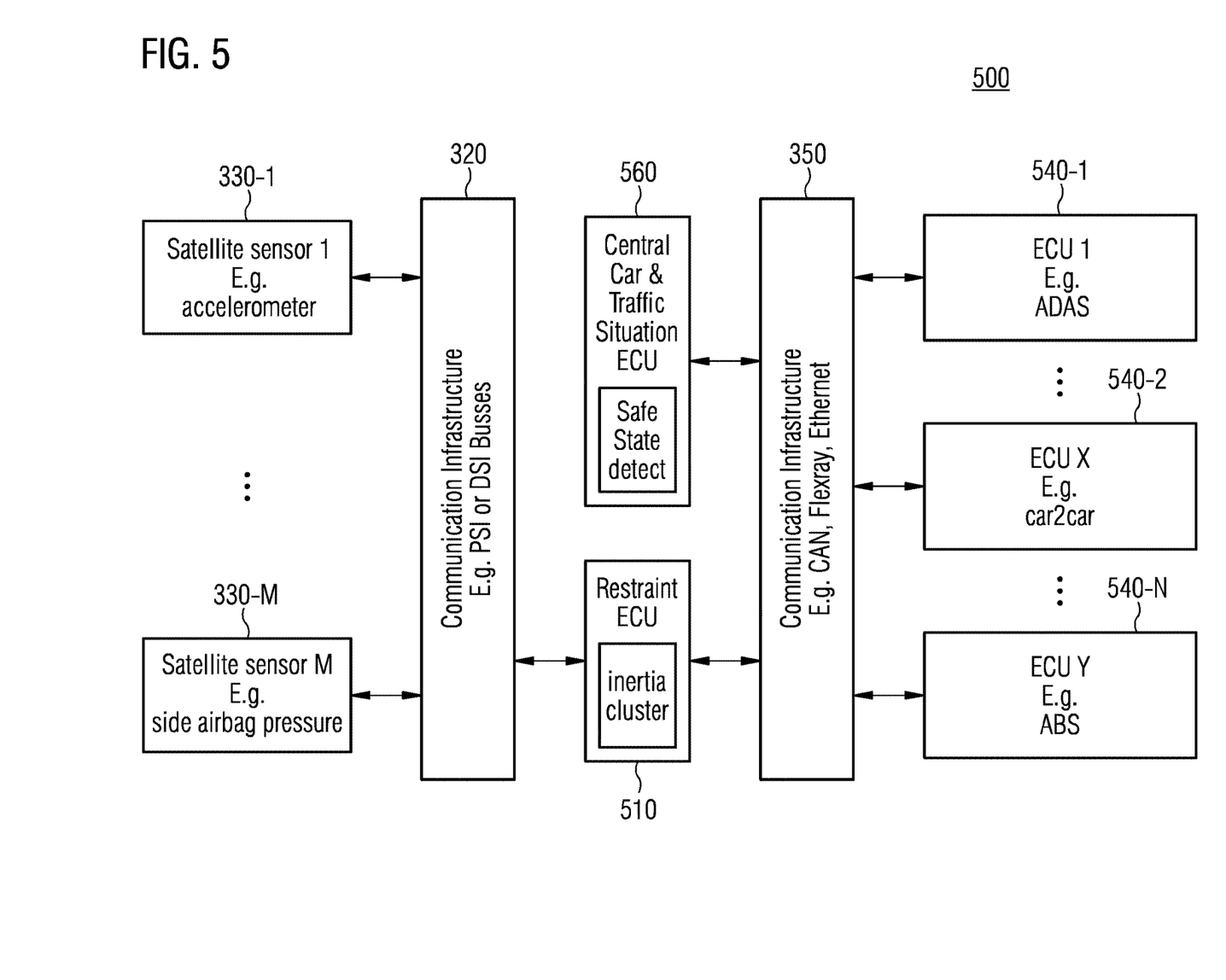
FIG. 5 illustrates a still further example of a control system for an automotive vehicle.

Still another control system 500 is illustrated in FIG. 5. The control system 500 is similar to the control systems 300 and 400 illustrated in FIGS. 3 and 4. However, in the control system 500 the functionality of the above apparatuses for generating safety information is implemented in a central ECU 560, and not in the ECU 510 of the airbag and restraint system. Compared to the ECUs 310 and 410 in the control systems 300 and 400, the ECU 510 comprises only the functionality of the above apparatuses for controlling a sensor device The central ECU 560 is coupled to the various other ECUs 540-1, 540-2, . . . , 540-N (e.g. ECUs similar to those illustrated in FIGS. 3 and 4) via the further communication infrastructure 350 described above. The ECU 560 is further coupled to the ECU 510 of the airbag and restraint system via the further communication infrastructure 350.

That is, a central ECU 560 is provided that determines the safety information for one or more of the sensor devices 330-1, . . . , 330-M. Since the ECU 560 is centralized, it may further generate safety information for sensor devices of other safety systems of the automotive vehicles.

For example, automotive vehicles comprising an autonomous driving functionality may enable a centralization of the functionality that delivers a complete picture of the driving situation in one ECU that takes global driving decisions as conventionally done by the driver. This may be the place to recognize a safe driving state that does not require an airbag. Hence, it may be beneficial to move the detection function to this place. This may deliver the best possible discrimination of the safe state since the amount of available information related to the driving situation may be highest.

The above examples of control systems for automotive vehicles may allow to perform self-test of sensors on demand of, e.g., a restraint ECU in case that a driving and traffic state of the vehicle can be classified as safe for at least a short predictable time window. This may allow extend diagnostic capability of speed sensors for high Automotive Safety Integrity Levels (ASIL).

Figure 6:
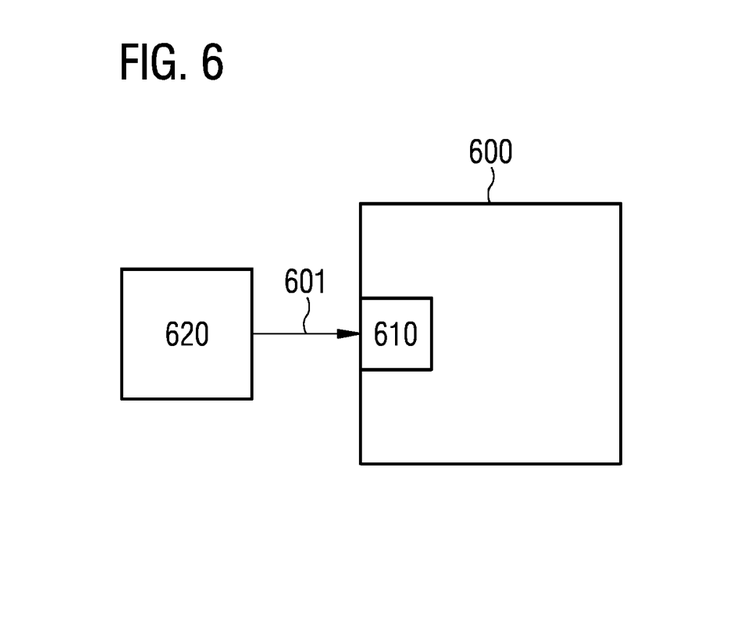
FIG. 6 illustrates an example of a sensor device for a safety system of an automotive vehicle.

FIG. 6 further illustrates a sensor device 600 for a safety system of an automotive vehicle. The sensor device 600 comprises an input node 610 configured to receive a control signal 601 from an ECU 620 of the automotive vehicle, if it is unlikely that the sensor device 600 senses a safety-relevant event within a future period of time. The control signal 601 comprises a command causing the sensor device 600 to perform a sensor diagnosis procedure.

The sensor device 600 may enable a sensor self-test during regular operation of the safety system. In particular, the sensor device 600 may enable a self-test not only during a startup procedure of the sensor device 600. The sensor device 600 may allow extended sensor diagnosis with reducing the safety of the automotive vehicle.

The sensor device 600 may be configured to perform the sensor diagnosis procedure in response to the receipt of the control signal 601.

In some examples, the sensor device 600 may support a plurality of sensor diagnosis procedures (i.e. two or more sensor diagnosis procedures). Accordingly, the control signal 601's command causing the sensor device 600 to perform a sensor diagnosis procedure may indicate the one of the plurality of sensor diagnosis procedures to be executed by the sensor device 600.

In some examples, the input node 610 may be configured to receive a further control signal 602 from the ECU 610, if it is no longer unlikely that the sensor device 600 senses the safety-relevant event within the future period of time. The further control signal 602 comprises a second command causing the sensor device 600 to immediately return to regular operation. That is, the sensor device 600 may be controlled to immediately interrupt the sensor diagnosis procedure in order to return to normal operation. This may allow an increased availability of the sensor device 600 for the safety system of the automotive vehicle.

The safety system of the automotive vehicle may, e.g., be an airbag system and/or a restraint system of the automotive vehicle. The sensor device 600 may, hence, allow to run extended sensor diagnosis without reducing the restraint system availability.

Figure 7:
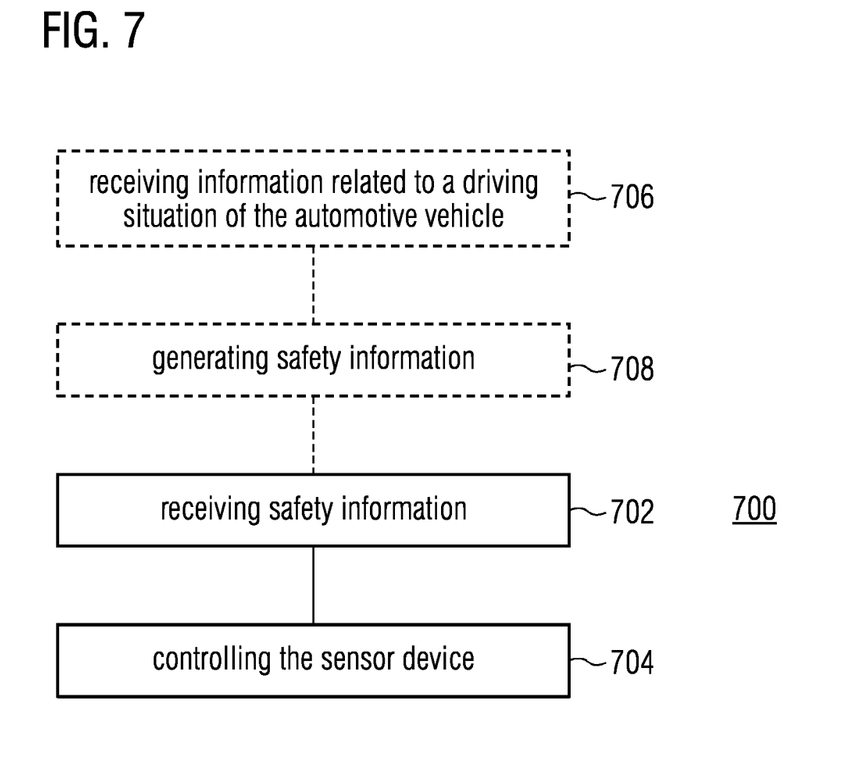
FIG. 7 illustrates a flowchart of an example of a method for controlling a sensor device of an object's safety system.

An example of a method 700 for controlling a sensor device of an object's safety system is illustrated by means of a flowchart in FIG. 7. The method 700 comprises receiving 702 safety information about a likelihood that the sensor device senses a safety-relevant event. Further, the method 700 comprises controlling 704 the sensor device to perform a sensor diagnosis procedure, if the safety information indicates that it is unlikely that the sensor device senses the safety-relevant event within a future period of time.

In some examples, the method 700 may additionally comprise receiving 706 information related to a driving situation of the automotive vehicle, and generating 708 the safety information based on the information related to the driving situation of the automotive vehicle.

The object's safety system may, e.g., be an airbag system and/or a restraint system of an automotive vehicle.

More details and aspects of the method are mentioned in connection with the proposed concept or one or more examples described above (e.g. FIGS. 1 to 5). The method may comprise one or more additional optional features corresponding to one or more aspects of the proposed concept or one or more examples described above.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for controlling a sensor of an object's safety system, comprising:
    an input node configured to receive safety information about a likelihood that the sensor senses a safety-relevant event; and
    a processing circuit configured to control the sensor to perform a sensor diagnosis procedure, if the safety information indicates that it is unlikely that the sensor senses the safety-relevant event within a future period of time, wherein the future period of time is longer than a period of time required for executing the sensor diagnosis procedure.

2. The apparatus of claim 1, wherein the processing circuit is configured to generate a control signal causing a temporary interrupt of a power supply to the sensor.

3. The apparatus of claim 1, wherein the processing circuit is configured to generate a control signal for the sensor, wherein the control signal comprises a command causing the sensor to perform the sensor diagnosis procedure.

4. The apparatus of claim 1, wherein the future period of time is longer than a response time of the safety system in response to the safety-relevant event.

5. The apparatus of claim 1, wherein the processing circuit is configured to control the sensor to immediately return to regular operation, if the safety information no longer indicates that it is unlikely that the sensor senses the safety-relevant event within the future period of time.

6. A control system for an automotive vehicle, comprising:
    a safety system of the automotive vehicle, wherein the safety system comprises a sensor configured to sense a safety-relevant event; and
    a sensor controller configured to control a sensor, the sensor controller comprising:
        an input node configured to receive safety information about a likelihood that the sensor senses the safety-relevant event;
        a processing circuit configured to control the sensor to perform a sensor diagnosis procedure, if the safety information indicates that it is unlikely that the sensor senses the safety-relevant event within a future period of time; and
    a safety information generator configured to generate the safety information, wherein the safety information generator is configured to receive information related to a driving situation of the automotive vehicle from a driver assistance system of the automotive vehicle and/or a communication system of the automotive vehicle for communication with objects outside the automotive vehicle, and generate the safety information based on the information related to the driving situation of the automotive vehicle, wherein the information related to the driving situation of the automotive vehicle indicates a second likelihood that the sensor senses the safety-relevant event within the future period of time, wherein the second likelihood is determined the driver assistance system based on at least one quantity sensed by the driver assistance system.

7. The control system of claim 6, wherein the safety information generator is configured to generate the safety information based on a correlation of the second likelihood and a third likelihood that the sensor senses the safety-relevant event within the future period of time, wherein the third likelihood is determined by a further driver assistance system based on at least one quantity sensed by the further driver assistance system.

8. The control system of claim 6, wherein an electronic controller of the safety system comprises the sensor controller, and wherein another electronic controller of the control system comprises the safety information generator.

9. The control system of claim 6, wherein an electronic controller of the safety system comprises the sensor controller and the safety information generator.

10. The control system of claim 6, wherein the processing circuit is further configured to correlate the safety information with information about at least one quantity sensed by the safety system, and wherein the processing circuit is configured to only control the sensor to perform the sensor diagnosis procedure if the safety information coincides with the information about the at least one quantity sensed by the safety system.

11. The control system of claim 6, wherein the safety system is an airbag system of the automotive vehicle.

12. A sensor for a safety system of an automotive vehicle, comprising:
an input node configured to receive a control signal from an electronic controller of the automotive vehicle, if it is unlikely that the sensor senses a safety-relevant event within a future period of time, wherein the control signal comprises a command causing the sensor to perform a sensor diagnosis procedure,
wherein the input node is configured to receive a further control signal from the electronic controller, if it is no longer unlikely that the sensor senses the safety-relevant event within the future period of time, wherein the further control signal comprises a second command causing the sensor to immediately return to regular operation.

13. A method for controlling a sensor of an object's safety system, comprising:
receiving safety information about a likelihood that the sensor senses a safety-relevant event; and
controlling the sensor to perform a sensor diagnosis procedure, if the safety information indicates that it is unlikely that the sensor senses the safety-relevant event within a future period of time, wherein the future period of time is longer than a period of time required for executing the sensor diagnosis procedure.

14. The method of claim 13, further comprising:
receiving information related to a driving situation of the automotive vehicle; and
generating the safety information based on the information related to the driving situation of the automotive vehicle.

15. The method of claim 13, wherein the object's safety system is an airbag system of an automotive vehicle.

* * * * *